United States Patent

Fourrey et al.

Patent Number: 5,121,964
Date of Patent: Jun. 16, 1992

[54] MOTOR-VEHICLE SEAT SITTING UNIT EQUIPPED WITH A RAISABLE CENTRAL PART FOR RECEIVING A CHILD'S SEAT

[75] Inventors: Francois Fourrey, Montbeliard; Roël Verhoog, Valentigney; Marc Mathiot, Mandeure, all of France

[73] Assignee: ECIA, France

[21] Appl. No.: 716,771

[22] Filed: Jun. 7, 1991

[30] Foreign Application Priority Data

Jun. 19, 1990 [FR] France .................. 90 07668

[51] Int. Cl.⁵ .............................. A47C 15/00
[52] U.S. Cl. ............................ 297/237; 297/236
[58] Field of Search ........... 297/237, 236, 234, 238, 297/105, 111, 250, 283, 335

[56] References Cited

U.S. PATENT DOCUMENTS 4,555,135 11/1985 Freeland .................. 297/237 X

FOREIGN PATENT DOCUMENTS 348374 12/1989 European Pat. Off. .
2709005 10/1978 Fed. Rep. of Germany ... 297/236 X
2823529 12/1979 Fed. Rep. of Germany ...... 297/236
3800896 9/1988 Fed. Rep. of Germany .
3922836 12/1989 Fed. Rep. of Germany .
2615799 12/1988 France .

Primary Examiner—Laurie K. Cranmer
Attorney, Agent, or Firm—Sughrue, Mion, Zinn, Macpeak & Seas

[57] ABSTRACT

This sitting unit comprises a central part (5) articulated on the front edge of the sitting unit and thus raisable forwards, a receptacle (7) designed to receive this central part (5) when it is turned down into the sitting unit, and a device (8, 8a, 12) for locking and retaining in the raised position the central part, to the rear face of which a child's seat can be attached. This arrangement increases the safety of the child in the event of a front collision of the vehicle because the child's seat faces rearwards, instead of facing forwards, so that, in the event of a collision, the child is already steadied in the seat and does not suffer the injuries caused by the belts which are conventionally used.

3 Claims, 1 Drawing Sheet

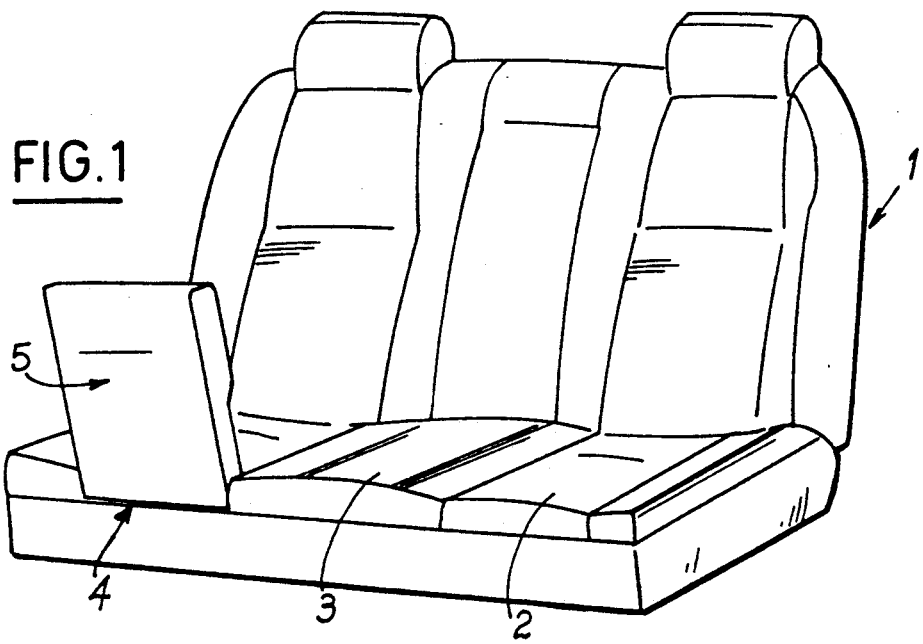
FIG.1
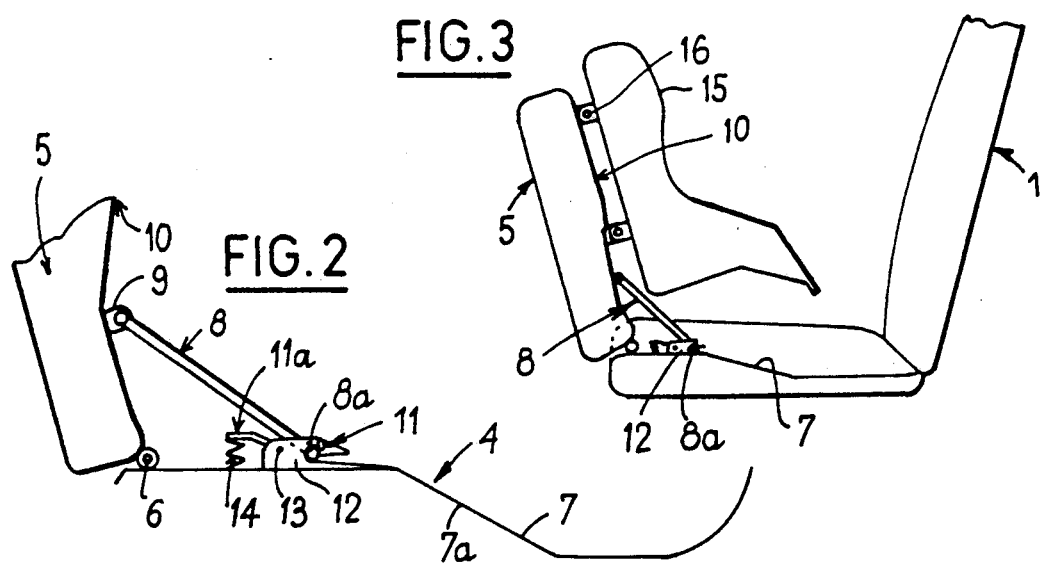
FIG.2
FIG.3
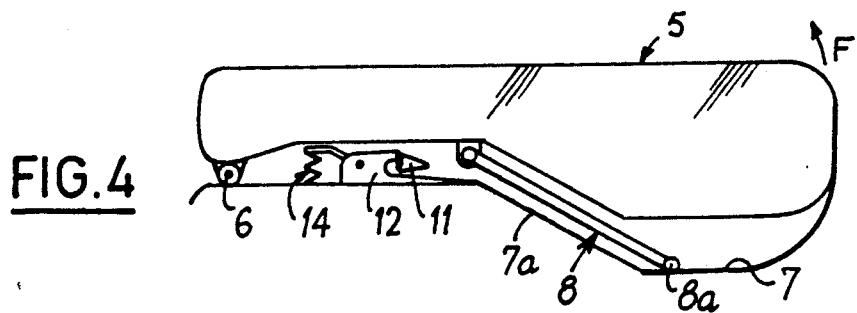
FIG.4

MOTOR-VEHICLE SEAT SITTING UNIT EQUIPPED WITH A RAISABLE CENTRAL PART FOR RECEIVING A CHILD'S SEAT

The subject of the present invention is a motor-vehicle seat sitting unit, such as for a front seat, a side or central position on a rear bench seat or, if appropriate, another type of seat.

It is known that removable child's seats are conventionally attached to the backs of the rear seats or, if appropriate, of a front seat, the child being retained by a cross-belt or by a strap. The result of this is that, in the event of a front collision of the vehicle, the child is thrown in the direction of travel of the vehicle and therefore suffers injuries caused by the cross-belt or strap. Moreover, these conventional arrangements for the installation of a child's seat make it necessary to provide, in the body, anchoring points for the straps or cross-belt, this complicating them and making them relatively expensive.

The object of the invention is, therefore, to provide a seat arrangement which does not have these disadvantages.

SUMMARY OF THE INVENTION

According to the invention, the seat sitting unit comprises a central part articulated on the front edge of the sitting unit and thus raisable forwards, a receptacle designed to receive this central part when it is turned down into the sitting unit, and means for locking and retaining the central part in the raised position.

According to one embodiment of the invention, the locking means comprise a U-shaped yoke, the ends of which are articulated freely on the central part, and a retractable catch articulated on an abutment which is fastened in the receptacle and against which the crossbar of the yoke can come to a stop, after the catch for locking the yoke in the corresponding raised position of the central part has been lifted.

Since the face of the central part turned rearwards when the sitting unit is raised is equipped with means for attaching a child's seat, this arrangement considerably increases the safety of the child installed in the seat. In fact, in the event of a front collision, the child is thrown in the direction of travel of the vehicle when it is already steadied in the seat, so that it does not suffer the injuries caused hitherto by the cross-belt or retaining strap.

Moreover, the arrangement of means for the removable fastening of the child's seat to the rear face of the raised central part eliminates the need to provide anchoring points for the straps in the body.

Other particular features and advantages of the invention will emerge from the following description made with reference to the accompanying drawings which illustrate one embodiment of it by way of a non-limiting example.

BRIEF DESCRIPTION OF THE DRAWINGS

FIG. 1 is a perspective view of a rear vehicle bench seat, one of the side sitting units of which is equipped according to the invention with a raisable central part.

FIG. 2 is a side elevation view of the sitting unit in FIG. 1, with its central part in the raised and locked position.

FIG. 3 is a side elevation view of the seat in FIGS. 1 and 2, with a child's seat attached to the raised central part.

FIG. 4 is a side elevation view of the sitting unit in FIGS. 1 to 3, with its central part turned down and folded away in the sitting unit.

DETAILED DESCRIPTION OF THE PREFERRED EMBODIMENT

The rear vehicle bench seat 1 illustrated in FIG. 1 comprises three sitting units 2, 3, 4, a side sitting unit 4 being equipped with a central part 5 articulated on the front edge of the sitting unit 4 about a transverse axis 6 and thus being capable of being raised forward, as can be seen in FIGS. 1 to 3.

Formed in the sitting unit 4 is a receptacle 7 designed for receiving the central part 5 in the turned-down position, so that it is folded away in the sitting unit 4, the receptacle 7 being suitably profiled for this purpose with an intermediate inclined plane 7a.

The sitting unit comprises means for locking and retaining the central part 5 in the raised position, which, in the example illustrated, comprises a U-shaped yoke 8, the ends of which are articulated freely on lugs 9 of the raisable part 5. The locking device comprises in complementary fashion a retractable catch 11 articulated about an axis 13 on an abutment 12 which is fastened in the receptacle 7 not far from the axis 6 and against which the crossbar 8a of the yoke 8 can come to a stop, after the catch 11 has been lifted. The central part 5 is thus retained and locked in its raised position.

Advantageously, the locking means comprises an elastic system for the return of the catch 11 into the position for locking the yoke 8. In the exemplary embodiment shown, this return system comprises a spring 14, one end of which is fastened to the bottom of the receptacle 7 between the abutment 12 and the axis 6 and the opposite end of which stresses the end part 11a of the catch 11 opposite that interacting with the crossbar 8a, so as to push this rear end of the catch 11 constantly into its position for locking the bar 8a.

In the turned-down position, folded away inside the receptacle 7, the yoke 8 of the central part 5 rests freely on the bottom of the receptacle 7 (FIG. 4), this yoke being inclined in the horizontal approximately in parallel with the intermediate plane 7a of the receptacle 7.

When the central part 5 is raised (arrow F in FIG. 4), the central part 5 tilts about the axis 6 until the crossbar 8a, which slides on the inclined plane 7a, lifts the catch 11 and comes to a stop against the abutment 12, thereby blocking the central part 5 in its position raised forwards, (FIGS. 1 to 3). During this operation, the catch 11 is lifted counter to the return force of the spring 14, and then the spring causes the catch 11 to tilt into its position shown in FIG. 2, in which it locks the bar 8a and the yoke 8 on the abutment 12. Since the face of the central part 5 turned rearwards is equipped with means for fastening a child's seat 15, for example hooks interacting with crossbars 16 fastened to the back of the seat 15, it is possible to put the latter in place on the raised part 5 in a very simple way.

Thus, the provision of a sitting unit 4 of which the central part 5 is raisable makes it possible to install at the rear of this a fastening device for the child's seat 15 which is efficient and both quickly available and accessible, without the need to resort to anchoring points specially made in the body for the conventional straps for retaining the child's seats used hitherto.

When the part 5 is turned down, the passenger's comfort is in no way affected in comparison with conventional sitting units, because the device for locking the central part 5 and for fastening the seat 15 is very compact and therefore takes up very little space under the part 5, of which the thickness of foam or of upholstery is identical to that of a conventional seat.

Finally, as already mentioned, facing the child's seat 15 rearwards rather than forwards appreciably increases the safety of the child in the event of a front collision.

Various fastening means can be employed for installing the child's seat 15 on the central part 5. Likewise, any other locking means equivalent to that described can be used, for example a latch without an elastic return system, instead of the locking catch 11.

We claim:

1. A motor-vehicle seat sitting unit (4) adapted to accommodate a child's seat, comprising:
    a central part (5) being selectively articulatable on a front edge of the sitting unit and raisable from a folded down position to a generally upright position;
    a receptacle (7) configured to receive said central part (5) when said central part (5) is folded down into the sitting unit; and
    means (8, 8a, 12) for locking and retaining the central part in the raised, upright position, said central part sized and configured to receive said child's seat, and comprising means for mounting and retaining said child's seat.

2. Sitting unit according to claim 1, characterised in that the said locking means comprise a U-shaped yoke (8), the ends of which are articulated freely on the central part (5), and a retractable catch (11) articulated on an abutment (12) which is fastened in the receptacle (7) and against which crossbar (8a) of the yoke (8) can come to a stop, after the catch for locking the said yoke in the corresponding raised position of the central part has been lifted.

3. Sitting unit according to claim 2, characterised in that the locking means comprise an elastic system for the return of a catch (11) into the position for stopping the yoke (8), for example a spring (14), one end of which is fastened to a bottom of the receptacle (7) and the other end of which exerts a push on the catch (11).

* * * * *